Patented Feb. 18, 1930.

1,747,187

UNITED STATES PATENT OFFICE

WINFIELD SCOTT, OF AKRON, OHIO, ASSIGNOR TO THE RUBBER SERVICE LABORATORIES CO., OF AKRON, OHIO, A CORPORATION OF OHIO

RUBBER-VULCANIZATION ACCELERATOR

No Drawing.   Application filed October 6, 1925.  Serial No. 60,732.

My present invention is directed to the art of producing vulcanized rubber, and is particularly concerned with a process of producing such a product by employing as accelerators of the vulcanization process, certain types of compounds, new for this purpose, as hereinafter fully set forth and described.

A large number of various types of chemical compounds heretofore have been described and employed commercially as rubber vulcanization accelerators. However, practically every compound that has been used for this purpose with any degree of success, has been either a liquid at ordinary temperatures, or a solid possessing a melting point below the maximum temperature reached during vulcanization.

The use of accelerators, the melting points of which are higher than the temperatures reached during the milling process, requires that such materials must be ground very finely to obtain a homogeneous dispersion throughout the rubber mix, and to prevent a spotting of the stock. Even tho these comparatively high melting accelerators be ground to such a degree that they pass through a screen having 200 meshes to the inch, it has been observed that satisfactory dispersion of the material in a rubber mix, is not always realized. Furthermore, the grinding of a compound to this degree of fineness, even while exercising the utmost care, often results in picking up a small quantity of foreign material, which may have a very detrimental effect on the rubber product. Moreover, the losses incurred by the dusting of such fluffy powders, and the tendency of such fine powders to pack and stick to the back roll of the mixing mill, have made more difficult the preparation of a homogeneous rubber compound, while the manufacture of successive batches possessing the same characteristics has been practically impossible. Incidentally, the use of certain compounds, such as hexamethylene-tetramine, in a fine state of division, is often a cause of much discomfort to workmen, since the dust of the material evolved in weighing and using the substance, frequently produces a skin rash.

I have now found that the difficulties as hereinbefore set forth, may be substantially avoided, if such comparatively high melting point accelerators as possess basic properties, be combined with a fatty acid, and the resulting compound used as an accelerator. As examples of such acids, I prefer to use those members of the fatty acid series which are but weakly acidic in nature, such as myristic, palmitic, stearic, arachidic, oleic, linoleic, ricinoleic acids, and the like. These acids, and others of like characteristics, may be readily combined with the organic bases to produce salts, or, as I prefer to term them, organic soaps.

Such compounds may be prepared most simply by mixing together the acid and the base in proper proportions while heating to a temperature, preferably slightly above the melting point of the acid used. Thus, for example, approximately 300 parts of stearic acid are heated to a temperature of about 80° C., and 240 parts of di-o-tolyl-guanidine are added slowly thereto, with stirring. The heat evolved during the reaction is sufficient to maintain the temperature mentioned during this stage of the process. After all the guanadine has been added, the temperature is increased to approximately 100° C., and maintained thereat preferably while stirring, for a period of time sufficient to insure the completion of the reaction. The stearate of di-o-tolyl-guanidine so obtained is a thick, syrup-like compound when first prepared. On standing for a few hours, it solidifies to a stiff cake resembling stearic acid in consistency, but of a darker color and possessing a lower softening point. The product may, if desired, be filtered while molten, directly into the shipping drum or container, thereby avoiding contamination with any impurities, which might be accidentally incorporated during the step. Other fatty acid compounds of the tolyl-guanidines, and of other similar compounds, may be prepared in a similar manner.

The temperatures mentioned above are by no means critical, and may vary, for example, between the melting point of the fatty acid, and the decomposition temperature of the substances employed. Thus, since diphenyl-guanidine decomposes at temperatures but slightly above its melting point, it would be necessary to maintain temperatures below 147° C. and preferably at about 140° C., when using this compound for the preparation of the compounds described.

Other methods of preparing the organic soaps of the type mentioned, may of course, be used. For example, a metallic stearate may be reacted with a salt of an organic base. Thus, sodium stearate may be reacted with di-phenyl-guanidine-hydrochloride, preferably dissolved in a suitable solvent whereby the organic soap is produced.

The organic soaps, and particularly those produced by combining a fatty acid with a di-substituted guanidine, may be milled into a rubber mix without observing any of the precautions necessary for the dispersion of powders into a mix, since the soaps flux very readily into the rubber and are molecularly dispersed therein. These organic soaps may be used with any grade of rubber, or rubber reclaim, but they show the greatest improvement in properties where the low quality rubbers are employed, such as those known to the trade as "roll-brown" rubber. In such a case, it has been observed that the tensile strengths at various degrees of elongation, and at break are consistently higher than those realized by employing in a similar composition an amount of a substituted guanidine equivalent to that used in the preparation of the soap.

An example of the effect produced by employing these organic soaps as accelerators in a rubber mix is shown by the following composition wherein 100 parts of rubber, such as the grade known to the trade as "pale crepe", 5 parts of zinc oxide, 3.5 parts of sulfur and 1 part of organic soap, such, for example, as di-o-tolyl-guanidine stearate, are mixed together in the well-known manner on the differential mixing mills. The mix is then vulcanized, preferably in a press under steam pressure. Samples of the product, vulcanized for the period indicated, were tested, with the results shown in the table.

| Time of cure | Steam pressure | Load necessary to produce elongation | | | Tensile at break (lbs. /sq. in.) | Ultimate elongation |
| --- | --- | --- | --- | --- | --- | --- |
| | | 300% | 500% | 700% | | |
| 15 minutes | 40 pounds | 102 | 201 | 630 | 2150 | 930 |
| 30 minutes | 40 pounds | 136 | 307 | 1045 | 2820 | 870 |
| 45 minutes | 40 pounds | 195 | 466 | 2000 | 3640 | 805 |
| 1 hour | 40 pounds | 234 | 596 | 2685 | 3585 | 768 |
| 1½ hours | 40 pounds | 304 | 824 | 3495 | 3750 | 715 |
| 2 hours | 40 pounds | 324 | 836 | 3505 | 3715 | 715 |

The above results indicate that a high quality product is obtained by vulcanizing the composition described for a period of about 1½ hours at the temperature given by 40 lbs. steam pressure per square inch.

Another example of the use of these organic soaps is shown by the following mix, wherein 31 parts of smoked sheet rubber, 20 parts of amber crepe, 13 parts of clay, 12 parts of carbon black, 4 parts of zinc oxide, 1.5 parts of mineral rubber, 1.75 parts of sulfur, and 1.25 parts of an organic soap are mixed together by milling. A test sheet, vulcanized for one hour at the temperature produced by 40 pounds of steam pressure per square inch showed the following results: at 300% elongation, 1235 lbs./sq. in.; at 500% elongation, 3120 lbs. per sq. in.; tensile at break, 4085 lbs./sq. in. and an ultimate elongation of 590%.

The organic soaps have been found to be very desirable accelerators for the production of tread stocks, having a comparatively high proportion of carbon black, and other stocks which will be milled under very high temperature conditions or will be tubed or calendered on hot machines. The use of organic soaps as accelerators in such stocks has been found to avoid the scorching effect commonly produced therein when employing the ordinary vulcanization accelerators. The avoidance of any scorching action is undoubtedly a result of the softening property of the organic soaps which however, does not persist after the vulcanization of the stock. This facilitates the mechanical handling of uncured stocks of the type mentioned. Furthermore, the organic soaps may be employed advantageously in the production of stocks to be used in the manufacture of pneumatic truck tires, where cures of from 2 to 3 hours are necessary.

The organic soaps may also be used in the manufacture of rubber heels. Such a stock may be prepared by milling together, in the well known manner, 15 parts of smoked sheet rubber, 30 parts of rubber reclaim, 5 parts of mineral rubber, 1 part of a softening oil, 2 parts of lime, 5 parts of carbon black, 3 parts of zinc oxide, 22 parts of clay, 15 parts of whiting, 1.2 parts of sulfur, and .05 parts of any of my preferred class of accelerators, known as an organic soap. The mixture, when cured for 15 minutes in a press, at a temperature given by 70 pounds of steam per square inch, produces an excellent heel, having a hardness of about 70. Such a stock is found to be very snappy and stiff.

Other examples of the use of my preferred type of accelerating compounds are apparent to those skilled in the art of rubber compounding. It is also possible to employ other organic soaps than those specifically mentioned. Broadly, my invention comprises the use as accelerators of the rubber vulcanization process of those compounds produced by the combination of organic bases, particularly of the aromatic series, with the higher members of the fatty acid series, and particularly those acids that exist as glycerides in naturally occurring fats. It is understood that my invention is not limited solely by the examples hereinbefore given as illustrative of a means of carrying out my process, nor is my invention limited by any theories advanced in explanation of the means of preparing or using my accelerators, but it is limited solely by the claims hereinafter set forth, wherein I intend to claim all novelty inherent in my invention, which is permissible in view of the prior art.

What I claim is:

1. The process of producing vulcanized rubber which comprises heating a mixture of rubber and sulfur in the presence of a compound formed by the combination of di-o-tolyl-guanidine and stearic acid.

2. The process of producing vulcanized rubber which comprises heating a mixture of rubber, sulfur and di-o-tolyl-guanidine stearate.

3. The vulcanized rubber product formed by heating a mixture containing rubber, sulfur and a compound formed by the combination of di-o-tolyl-guanidine and stearic acid.

4. In the process of producing a vulcanized rubber, the step which comprises mixing rubber with di-o-tolyl-guanidine stearate prior to vulcanization.

5. As an accelerator of the rubber vulcanization process, the compound produced by reacting di-o-tolyl-guanidine with stearic acid.

In testimony whereof I affix my signature.

WINFIELD SCOTT.